United States Patent [19]

Loxley

[11] Patent Number: 4,846,210

[45] Date of Patent: Jul. 11, 1989

[54] PRESSURE RESPONSE FLOW CONTROL VALVE ASSEMBLY

[75] Inventor: Russell A. Loxley, Leicester, England

[73] Assignee: Rolls Royce plc, Derby, Great Britain

[21] Appl. No.: 242,610

[22] Filed: Sep. 9, 1988

[30] Foreign Application Priority Data

Nov. 5, 1987 [GB] United Kingdom ............... 8725955

[51] Int. Cl.$^4$ ............................................. G05D 16/00
[52] U.S. Cl. .................................................. 137/110
[58] Field of Search ....................... 137/110, 488, 485; 60/39.281

[56] References Cited

U.S. PATENT DOCUMENTS 4,493,187 1/1985 Hansen .
4,646,774 3/1987 Hansen .

Primary Examiner—Alan Cohan
Attorney, Agent, or Firm—Cushman, Darby & Cushman

[57] ABSTRACT

A valve assembly for controlling the fluid flow to the fuel spray nozzles in the combustion chamber of a gas turbine aeroengine. The valve assembly comprises a main flow valve whereby translation of the main valve beyond a predetermined limit initiates movement of a control valve by a mechanical interconnection means. Movement of the control valve serves to activate means for fluid communication between the main valve and the control valve, venting some of the pressurized fluid flow acting on main valve to the control valve and subsequently to the fluid outlet. The more sensitive operation and hence quicker response time for any given change in fluid pressure at the inlet to the valve assembly results in rapid closure of the valve assembly when the fluid flow is decreasing which discourages dribble occurring.

8 Claims, 1 Drawing Sheet

VALVE AND TRAVEL ⟶
+ INCREASING FLUID FLOW ⟶

HP IN − HP OUT

PRESSURE RESPONSE FLOW CONTROL VALVE ASSEMBLY

This invention relates to valves used for controlling fluid flow along a pipe or duct in response to the pressure of the fluid in said pipe or duct, being particularly but not exclusively applicable to valves for controlling the fluid flow to the fuel spray nozzles in the combustion chamber or chambers of a gas turbine aeroengine.

Fuel control systems of gas turbine aeroengines currently include several valves to control the flow of fuel to the fuel spray nozzles in the combustion chamber or chambers of the engine. As well as a main fuel flow metering valve, which in recently designed engines is controlled by an electronic control unit in accordance with input signals representative of the engine conditions and commands from the flight station, there will also be a shut-off cock, usually situated downstream of the metering valve, and a number of so-called flow distribution valves situated immediately upstream of the fuel spray nozzles. The shut-off cock is used to prevent fuel flow to the engine when the engine is shut down and may be controlled from the flight station, whereas the flow distribution valves—one for each spray nozzle—ensure that each spray nozzle draws the same amount of fuel per unit time from the fuel manifold to which the fuel from the metering valve is delivered. Further information about such fuel supply systems is readily available—see for example the 4th edition of the book "The Jet Engine", published by Rolls-Royce plc in 1986.

A problem which can arise with such fuel systems—concerns rotation of the engine while it is being shut down and "windmilling", the condition in which the engine's rotor blades are driven around by airflow passing through the engine.

Fuel pumps in present fuel supply systems are usually mechanically driven through gear trains linked to the main engine shaft. Such rotations of the engine can therefore result in small quantities of fuel being forced past the valves and thereby causing dribble at the fuel spray nozzles. This fuel may collect in the still hot engine jet pipe and as a result be ignited. A further problem may arise in the event of the shut-off cock failing partially open. A reduced fuel flow is then supplied which whilst being insufficient to substain normal combustion may collect and be ignited elsewhere in the engine.

An object of the present invention is to substantially eliminate the aforementioned dribbling of fuel through the fuel supply system, thereby increasing safety and ease of operation of the engine.

According to the present invention a valve assembly comprises a fluid inlet, a fluid outlet, a main translatable valve, which main valve includes a first reaction surface and a second larger reaction surface in fluid flow series relationship, whereby a fluid flow from a pressurised source directed to said fluid inlet acts on the first reaction surface to initiate translation of the main valve to permit said fluid flow to subsequently act upon the second larger reaction surface thereby increasing the distance translated by the main valve in response to the pressurised fluid flow, allowing passage of the fluid flow from the fluid inlet to the fluid outlet which fluid outlet is opened by the further translation of the first reaction surface, subsequent movement of the main valve beyond a predetermined limit initiating movement of a control valve which movement serves to activate a means of fluid communication between the second reaction surface of the main valve and the control valve, thereby venting some of the pressurised fluid flow acting on the second reaction surface to the control valve and subsequently to said fluid outlet, whereby a subsequent decrease in the pressure of the fluid flow from the source results in rapid closure of the main valve due to the reduction by venting of the pressure of said fluid flow acting on the second reaction surface.

Preferably the control valve is a spool valve.

The control valve preferably includes a fluid latch for retention of said control valve in a position to provide fluid communication between the valves.

The fluid latch is preferably arranged so that after movement of the control valve to a position which activates fluid communication between the valves, some of the fluid flow acting on the first reaction surface of the main valve flow through a means of fluid communication to pressurise the end face of the control valve to retain said control valve in the activated position.

Preferably the subsequent movement of the control valve is initiated by a mechanical interconnection means.

The interconnection means between said valves is preferably a rod and collar which acts in abuttance with said valves.

Preferably the means of fluid communication is a conduit.

The valve assembly is preferably for use in a gas turbine aeroengine.

The present invention will now be described by way of example and with reference to the accompanying drawings in which.

Figure 1:
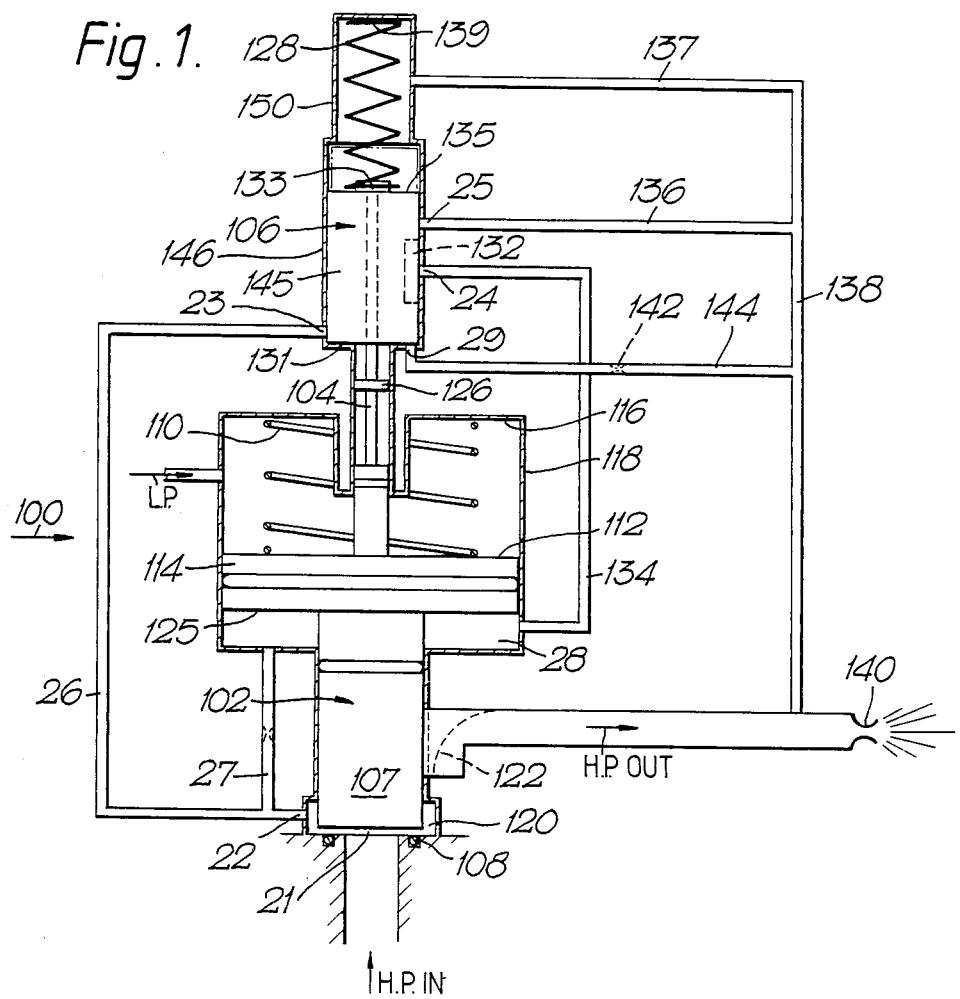
FIG. 1, shows a valve assembly in accordance with the present invention.

With reference to FIG. 1, a fuel valve assembly generally indicated at 100 comprises a main flow valve 102 and a secondary control valve 106 which are sequentially operated. The main flow valve, 102, and the secondary control valve 106, are mechanically interconnected by a piston rod, 104, and are in fluid communication with each other via a conduit, 134.

Operation of the main valve, 102, is controlled by a compression spring, 110, which is interposed between the rear surface, 112 of a large diameter piston head, 114, which is integral with a cylindrical piston, 107, of the main flow valve 102 and the upper surface, 116, of a cylinder, 118, within which the piston head, 114, is slidable.

The control valve, 106, comprises a piston 145 slidable within a cylinder 146 which piston 145 is provided with a recess, 132. A compression spring, 128, is interposed between the rear surface, 135, of the cylindrical piston 145 and the upper surface, 139, of a cylindrical housing 150 which is continuous with the cylinder 146.

The valve assembly 100 operates to open a profiled port, 122, to supply fuel to the fuel spray nozzles 140 in the combustion chamber of a gas turbine aeroengine. Operation of the valve assembly 100 is dependant upon the pressure of the fuel whose flow it is controlling.

At low pressure fuel supply the cylindrical piston, 107, of the main flow valve, 102, is seated against a seal, 108, which is shown as an 'O' ring seal though it will be appreciated alternatives are acceptable, such that a fuel inlet, 21 is sealed. A high fuel inlet pressure "HPin" initially unseats the cylindrical piston, 107, to fractionally open the valve, 102, shown by region AB in FIG. 2. The valve movement is resisted by the compression spring, 110, and the rear of the piston head, 114, is referenced to a low pressure fluid.

For subsequent low increasing flow rates, the fluid flow (HPin) is only a little above the low fluid pressure (LP) to which the rear of the piston head, 114, is referenced. After unseating of the valve, 102, fuel flows through the fuel inlet, 21, into an annular chamber, 120, defined around the cylindrical piston, 107, of the main flow valve, 102. Fuel then passes from the chamber 120 through an outlet, 22, along a duct 27, into a volume, 28, to exert pressure on the undersurface, 125, of the piston head, 114. Opening of the outlet, 22, by the movement of the cylindrical portion, 107, of the main flow valve, 102, causes a rapid fall in "HPin", and corresponds to region BC on the graph of FIG. 2. The fuel pressure exerted on the undersurface, 125, of the piston head, 114, results in more rapid movement of the valve, 102, opening the profiled port, 122. This movement of the valve, 102, is represented by CD on the graph in FIG. 2, whereby opening of the profiled port 122 causes "HPin - HPout" for the main fluid flow to become effectively constant for the large travel of the main flow valve, 102.

Further movement of the main flow valve, 102, causes a collar, 126, provided on the rod connection, 104, to abut the cylindrical piston 145 of the secondary control valve, 106, which then moves against the compression spring 128.

The cylindrical housing 150 in which the spring 128 is located, is vented along a duct, 137, to a duct, 138, which in turn joins the main flow to the fuel spray nozzle, 140.

The recess 132 in the control valve, 106, provides the interconnection of the inlet port, 24, to an outlet port 25 both of which are located in the wall of the cylinder 146, after the collar 126 of the piston rod 104 has abutted the piston 145 of the control valve, 106. Connection of the inlet port, 24, to the outlet port, 25, allows the flow of fuel from the annulus, 28, through a duct, 134, and out through ducts 136 and 138 to join the main fuel flow to the fuel spray nozzle burners. The control valve, 106, thereby vents the annulus, 28, to the fuel flow outlet supplying the burner nozzles 140, causing HPin to fall which corresponds to an increase in "HPin-HPout" (region DE of the graph in FIG. 2), for the small distance of travel of the main flow valve, 102, to open the control valve 106.

Movement of the piston 145 of the control valve, 106, causes the exposures of the inlet, 23, allowing fuel in the duct 26, to flow through the inlet 23 and into the duct 144. A restrictor 142 in the duct 144 reduces the fuel flow through the outlet, 29. This causes the fuel to exert a pressure on the exposed face, 131, of the piston 145 of the control valve, 106, whereby the valve 106 is latched, preventing further movement in the event of flight manoeuvres. The control valve, 106, is therefore sustained in the operational mode and acts as a fluid latch which maintains the fluid communication between the ducts 134 and 136.

For high increasing fluid flow rates, the fluid pressure HPin, becomes large compared with the flow fluid pressure (LP) to which the rear of the piston head 114 is referenced. The operation of the valve assembly, 100, therefore changes as the force generated by the high fluid flow rates a sufficient to overcome the resistance of the spring, 110, acting on the rear face, 114, of the main flow valve, 102.

Figure 2:
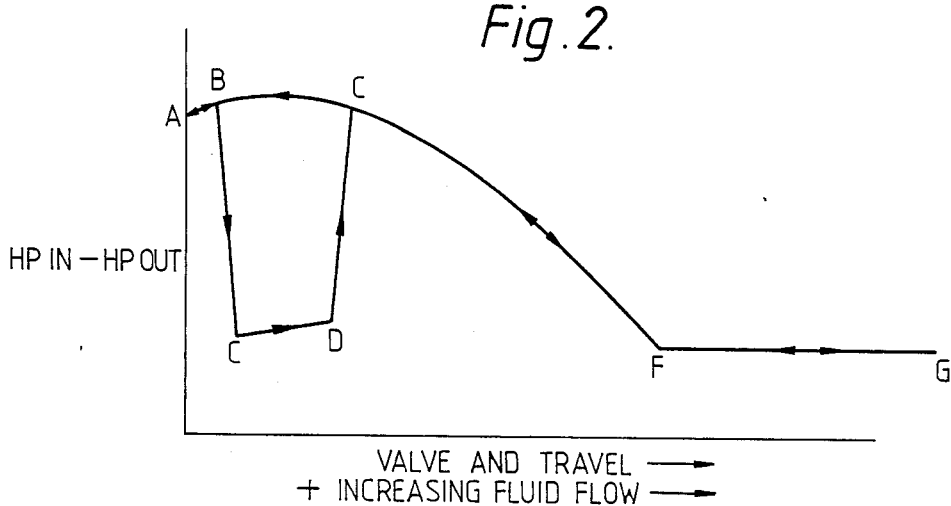
FIG. 2, shows a graph in which the fuel flow pressure "HPin - HPout" across a main flow valve shown in FIG. 1 is plotted against main flow valve movement.

The operation of the valve assembly 100 with a high increasing fluid flow is indicated in FIG. 2 by the curve AFG, whereby a high pressure is still required to unseat the piston, 107, initially, whereupon the main valve, 102, moves under the high increasing fluid flow pressure opening the profiled port, 122. so that for large valve travel the fluid flow increases through the profiled port, 122, to supply fuel to the burner nozzles, 140, resulting in a decrease in the pressure differences shown by region AF in FIG. 2, when the profiled port, 122, is fully open the pressure differences remain constant shown by the region FG of the graph in FIG. 2.

The characteristics of the valve assembly 100 will now be described with reference to decreasing fluid flow rates. The venting of the annulus, 28, reduces the flow pressure, HPin, whereby the pressure differential across the main flow valve, 102, is increased. Any further decrease in pressure at the fuel inlet, 21, results in, closure of the main flow valve. 102, as the spring, 110 acts against the vented annulus, 28, pressure, resulting in the rapid closure of the profiled port, 122. The control valve, 106, remains open until the profile port, 122 has been closed by the main flow valve, 102, thereby venting the annulus, 28, to HPout to that "HPin - HPout" remains high for large valve travel. Which corresponds to region EB on FIG. 2. The control valve, 106, remains latched open until the main flow valve, 102, moves sufficiently to cause a collar, 133, provided on the end piston rod, 104, to engage with the upper surface, 135 of the piston 145 subsequent movement causes the collar, 133, to translate the piston 145 and break the existing fluid latch thereby initiating movement of the two valves 102 and 106 in unison.

There is a small delay between the closure of the profiled port, 122, by the main flow valve, 102, and complete closure of the control valve, 106. The control valve, 106, is returned to its initial closed position by the spring, 128, only when the main flow valve, 102, is finally seated. Appropriate design of the assembly 100 ensures minimisation of the undesired fuel flow due to the delay between closure of the profiled port 122 and closure of the control valve, 106.

Venting of the annulus, 28, by the control valve, 106, initiating fluid communication between the two valves 106 and 102, results in more sensitive operation and a quicker response time for any given inlet change in pressure, HPin. This results in the rapid closure of the main flow valve, 102 and hence there is a corresponding reduction in the time for closure of the profiled port, 122 when the inlet fluid flow rate is decreasing, which discourages dribble occurring at the burners 140.

I claim:
1. A valve assembly comprising,
 a main translatable valve, which main valve includes a first reaction surface and a second larger reaction surface in fluid flow series relationship,
 a fluid inlet so adapted that a flow from a pressurised source directed thereto acts on the first reaction surface of the main translatable valve to initiate movement of the main valve, which movement permits said fluid flow to subsequently act upon the second larger reaction surface of the main valve increasing the distance travelled by the main valve in response to the pressurised fluid flow, further translation of the first reaction surface opening a fluid outlet to allow passage of the fluid flow from the fluid inlet to the fluid outlet, subsequent movement of the main valve beyond a predetermined limit being arranged to initiate movement of a control valve, a means of fluid communication between the second reaction surface of the main valve and the control valve, said movement of the control valve serving to activate said means of fluid communication to vent some of the pressurised fluid flow acting on the second reaction surface to the control valve and subsequently to said fluid outlet, a subsequent decrease in the pressure of the fluid flow from the pressurised source resulting in closure of the main valve due to the reduction of the pressure acting on the second reaction surface by venting through the control valve.

2. A valve assembly as claimed in claim 1 in which the control valve is a spool valve.

3. A valve assembly as claimed in claim 1 whereby the control valve includes a fluid latch for retention of said control valve in a position to provide fluid communication between the valves.

4. A valve assembly as claimed in claim 3, wherein after movement of the control valve to a position which activates fluid communication between the valves, some of the fluid flow acting on the first reaction surface of the main valve flows through a means of fluid communication to pressurise the end face of the control valve to retain said control valve in the activated position.

5. A valve assembly as claimed in claim 1 in which the subsequent movement of the control valve is initiated by a mechanical interconnection means.

6. A valve assembly as claimed in claim 1 in which the connection means comprises a rod and collar which acts in abuttance with said valves.

7. A valve assembly as claimed in claim 1 in which the means of fluid communication comprises a conduit.

8. A valve assembly as claimed in claim 1 for use in an aeroengine fuel system.

* * * * *